(12) United States Patent
Hope

(10) Patent No.: US 7,934,338 B2
(45) Date of Patent: May 3, 2011

(54) FISHING POLE ACCESSORY

(75) Inventor: Edward Hope, Wichita, KS (US)

(73) Assignee: Tackobox LLC, Wichita, KS (US)

( * ) Notice: Subject to any disclaimer, the term of this patent is extended or adjusted under 35 U.S.C. 154(b) by 210 days.

(21) Appl. No.: 12/051,911

(22) Filed: Mar. 20, 2008

(65) Prior Publication Data

US 2009/0158635 A1  Jun. 25, 2009

Related U.S. Application Data

(60) Provisional application No. 61/014,912, filed on Dec. 19, 2007.

(51) Int. Cl.
*A01K 97/12* (2006.01)
(52) U.S. Cl. ............................................................. 43/17
(58) Field of Classification Search ........................ 43/17
See application file for complete search history.

(56) References Cited

U.S. PATENT DOCUMENTS

| | | | | |
|---|---|---|---|---|
| 4,051,616 A * | 10/1977 | Mathauser | ........................ | 43/17 |
| 4,276,711 A * | 7/1981 | Mathauser | ........................ | 43/17 |
| 4,418,489 A * | 12/1983 | Mathauser | ........................ | 43/17 |
| 4,466,211 A * | 8/1984 | Mathauser | ........................ | 43/17 |
| 4,586,284 A | 5/1986 | Westwood, III | | |
| 4,693,125 A * | 9/1987 | Krutz et al. | ........................ | 43/17 |
| 4,748,761 A * | 6/1988 | Machovina | ........................ | 43/17 |
| 5,182,873 A * | 2/1993 | Aragon, Jr. | ........................ | 43/17 |
| 5,228,228 A | 7/1993 | Meissner | | |
| 5,274,943 A | 1/1994 | Ratcliffe et al. | | |
| 5,526,601 A * | 6/1996 | Onuma et al. | ...................... | 43/17 |
| 5,639,038 A | 6/1997 | Hirose | | |
| 5,653,643 A | 8/1997 | Falone et al. | | |
| 5,832,652 A | 11/1998 | Bartys | | |
| 5,833,156 A * | 11/1998 | Park et al. | ............................ | 43/4 |
| 6,035,573 A | 3/2000 | Flores | | |
| 6,335,100 B1 | 1/2002 | Tominaga et al. | | |
| 6,446,380 B1 | 9/2002 | Radosavljevic et al. | | |
| 6,584,722 B1 * | 7/2003 | Walls et al. | .......................... | 43/4 |
| 6,594,942 B1 | 7/2003 | Sherwood et al. | | |
| 6,708,441 B2 * | 3/2004 | Dirito | ................................ | 43/17 |
| 6,758,006 B1 * | 7/2004 | Walls et al. | ...................... | 43/4.5 |
| 7,003,912 B1 * | 2/2006 | Morgan et al. | ..................... | 43/17 |

(Continued)

FOREIGN PATENT DOCUMENTS

EP 1611787 A1 * 1/2006

(Continued)

OTHER PUBLICATIONS

International Search Report in related PCT Patent Application Serial No. PCT/US08/83079, issued Jan. 15, 2009, 2 pages.

*Primary Examiner* — Darren W Ark
(74) *Attorney, Agent, or Firm* — Lathrop & Gage LLP

(57) ABSTRACT

A fish detection accessory to be installed on the end of a fishing pole or which alternately can be incorporated into a fishing pole during manufacture of the pole. The unit employs a miniature dual axis accelerometer integrated circuit that can detect angular rotation of the unit relative to the earth's surface, allowing the unit to detect a fish bite based on vibration method, i.e. rotation of the pole per unit time, or on a rotation method, i.e. rotation of the pole independent of time. Bite detection sensitivity levels and alarm methods can be selected by the user using the power switch and two setting switches. The unit can also be used as a mini flashlight.

3 Claims, 3 Drawing Sheets

U.S. PATENT DOCUMENTS

| | | | |
|---|---|---|---|
| 7,021,140 B2 * | 4/2006 | Perkins | 73/493 |
| 7,043,867 B1 | 5/2006 | Fox | |
| 7,140,144 B1 * | 11/2006 | Morgan et al. | 43/17 |
| 7,234,351 B2 * | 6/2007 | Perkins | 73/493 |
| D551,317 S | 9/2007 | Hope | |
| 7,322,253 B2 * | 1/2008 | Owens | 43/17 |
| 7,523,882 B2 * | 4/2009 | Priednieks | 242/224 |
| 7,562,488 B1 * | 7/2009 | Perkins et al. | 43/17 |
| 7,712,695 B2 * | 5/2010 | Yusa et al. | 43/4 |
| 7,861,454 B2 * | 1/2011 | Pekin | 43/17 |
| 2005/0166411 A1 * | 8/2005 | Scorvo | 33/471 |
| 2005/0193616 A1 * | 9/2005 | Johnson | 43/17 |
| 2005/0200836 A1 * | 9/2005 | Scorvo | 356/138 |
| 2006/0117638 A1 * | 6/2006 | Park | 43/17 |
| 2006/0162451 A1 * | 7/2006 | Perkins | 73/511 |
| 2007/0199230 A1 | 8/2007 | Pekin | |
| 2008/0066367 A1 * | 3/2008 | Meeks et al. | 43/17 |
| 2008/0178514 A1 | 7/2008 | Pekin | |
| 2010/0000143 A1 * | 1/2010 | Pekin | 43/17 |

FOREIGN PATENT DOCUMENTS

| | | | |
|---|---|---|---|
| EP | 1611787 A1 | | 4/2006 |
| JP | 63287433 A | * | 11/1988 |
| JP | 01296932 A | * | 11/1989 |
| JP | 06038655 A | * | 2/1994 |
| JP | 06125681 A | * | 5/1994 |

* cited by examiner

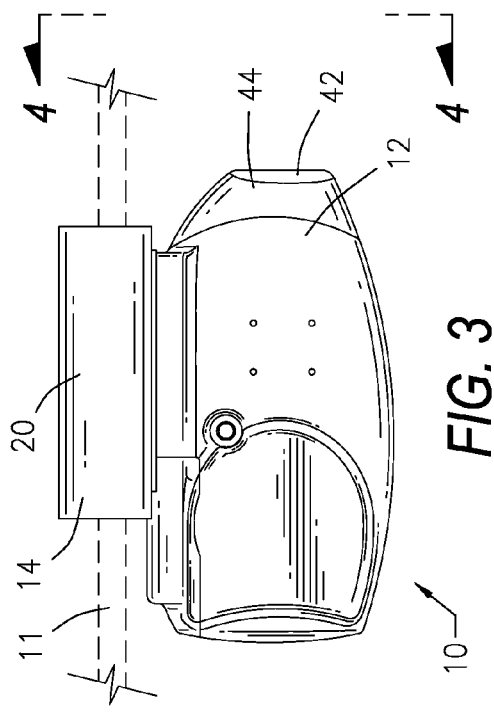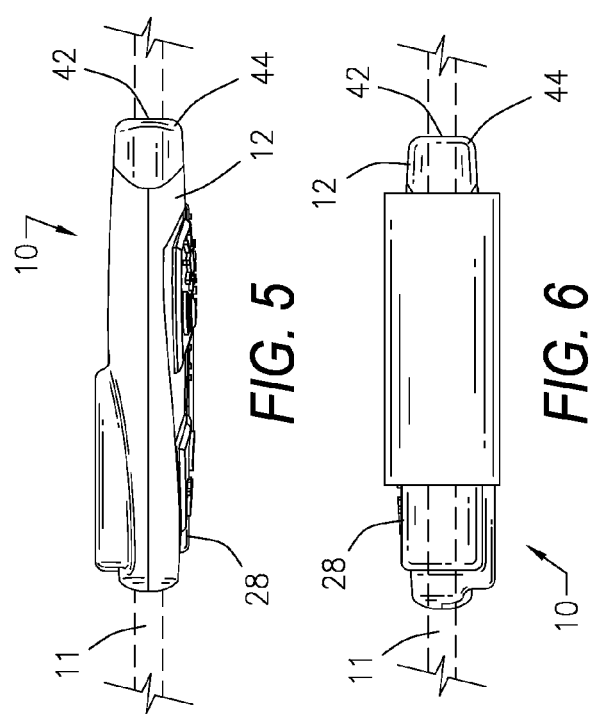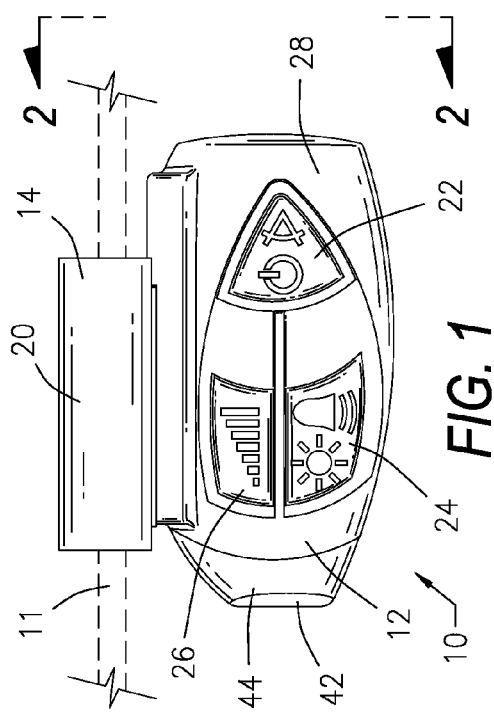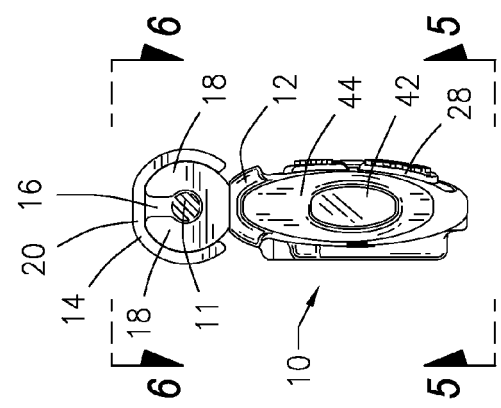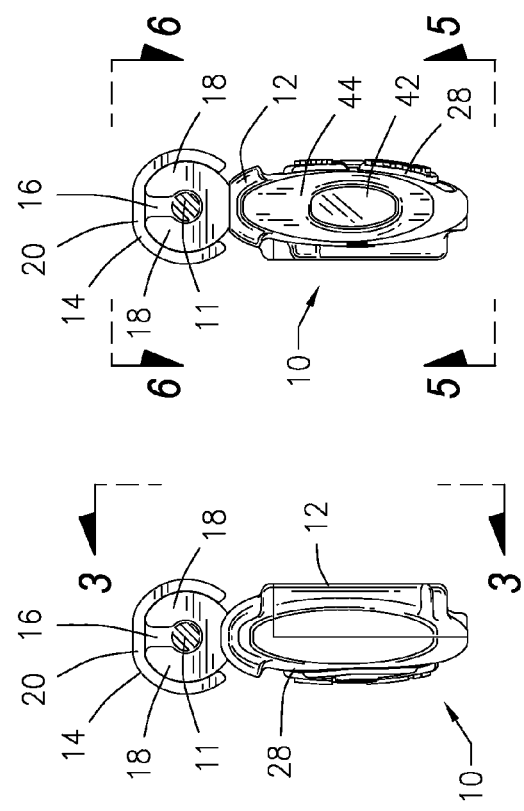

FISHING POLE ACCESSORY

CROSS-REFERENCE TO RELATED APPLICATIONS

The present application claims priority to U.S. Provisional Patent Application Ser. No. 61/014,912 filed on Dec. 19, 2007 for Fishing Pole Accessory.

BACKGROUND OF THE INVENTION

1. Field of the Invention

The present invention is a fish detection system to be installed on the end of a fishing pole or which alternately can be incorporated into a fishing pole during manufacture of the pole which employs a miniature dual axis accelerometer integrated circuit. It is designed to give the fisherman the maximum flexibility in detecting a bite on multiple pole types, in the dark, or while the fisherman is taking a nap. The invention has many settings for alarm method and for bite detection level. The invention has one power switch and two setting switches.

2. Description of the Related Art

Various devices have been invented for giving a fisherman a visual or audible indication when a fish has struck the bait on the end of the fisherman's fishing line. However, none of the devices currently available have the ability to provide the fisherman with ice fishing capabilities and provide the adjustability of sensitivity provided by the present invention. The present invention improves over the prior art because of its utilization of integrated circuit accelerometer technology to detect a fish strike.

This is the first fish bite detector to utilize integrated circuit accelerometer technology to detect fish strike. This is the first fish bite detector to utilize integrated circuit accelerometer technology to detect fishing pole angle change to detect the presence of a fish. This is the first fish bite detector to utilize integrated circuit accelerometer technology to detect an angle change of the fishing pole tip relative to the axis of the earth. This is the first fish bite detector to have operator setting ability of vibration sensitivity. This is the first fish bite detector to have operator setting ability of relative change in angle of the fishing pole. This is the first fish bite detector to automatically detect and reference its current position with the earth axis to later determine an angle change. This is the first fish bite detector to have operator setting ability of multiple alarm modes. This is the first fish bite detector to have operator setting ability of multiple alarm methods. This is the first fish bite detector to have detailed and varying tones to indicate operation parameters and alarms.

SUMMARY OF THE INVENTION

The present invention is a fish detection system to be installed on the end of a fishing pole or which alternately can be incorporated into a fishing pole during manufacture of the pole which employs a miniature dual axis accelerometer integrated circuit. It is designed to give the fisherman the maximum flexibility in detecting a bite on multiple pole types, in the dark, or while the fisherman is taking a nap. The accessory has many settings for alarm method and for bite detection level. The accessory has one power switch and two setting switches.

BRIEF DESCRIPTION OF THE DRAWINGS

FIG. 1 is a left side view of a fishing pole accessory constructed in accordance with a preferred embodiment of the present invention and shown attached to a fishing pole.

FIG. 2 is a rear elevation of the fishing pole accessory and attached fishing pole taken along line 2-2 of FIG. 1.

FIG. 3 is a right side view of the fishing pole accessory and attached fishing pole taken along line 3-3 of FIG. 2.

FIG. 4 is a front elevation of the fishing pole accessory and attached fishing pole taken along line 4-4 of FIG. 3.

FIG. 5 is a bottom plan view of the fishing pole accessory and attached fishing pole taken along line 5-5 of FIG. 4.

FIG. 6 is a top plan view of the fishing pole accessory and attached fishing pole taken along line 6-6 of FIG. 4.

DETAILED DESCRIPTION OF THE PREFERRED EMBODIMENT

Figure 7:
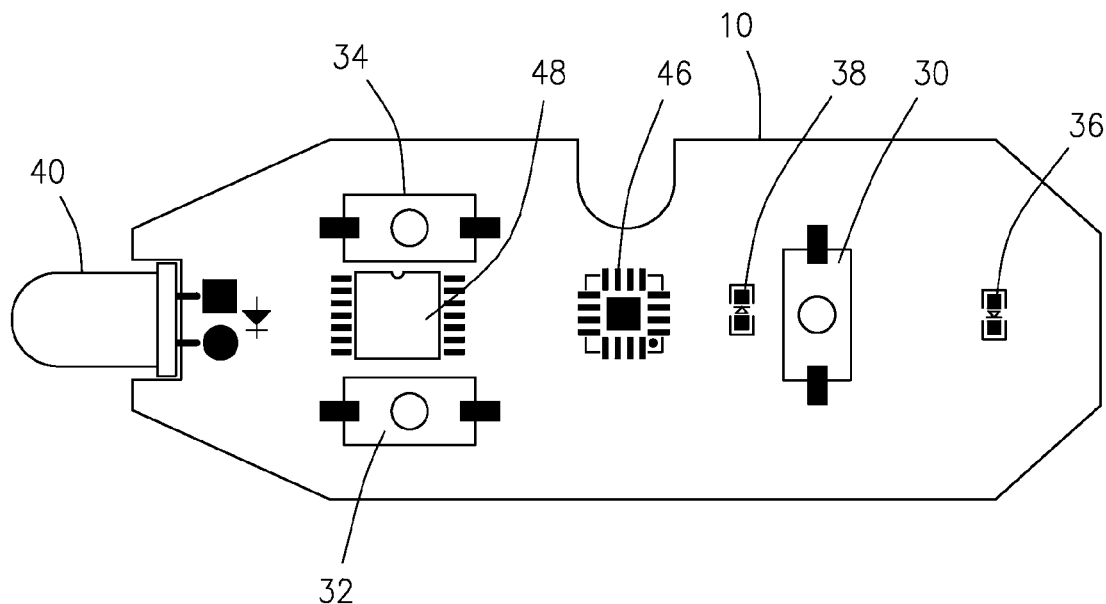
FIG. 7 is a schematic showing the external components of the accessory.

Referring now to the drawings and initially to FIGS. 1-6, there is illustrated an accessory 10 for fishing pole 11 constructed in accordance with a preferred embodiment of the present invention. The accessory 10 attaches to an existing fishing pole 11 or alternately is incorporated into a fishing pole 11 when the fishing pole 11 is manufactured. The accessory 10 is a fish detection indicating device. Although the accessory 10 can be incorporated into the fishing pole 11 when the pole 11 is manufactured, the drawings and the description of the accessory 10 that follows will focus on an accessory 10 that can be removably attached to an existing fishing pole 11. Whether the accessory 10 is built into the fishing pole 11 or added after the fishing pole 11 is manufactured, the electronics and function of the accessory 10 are the same.

For the accessory 10 illustrated in FIGS. 1-6, the accessory 10 is provided with an external case 12 which covers and protects the electronic parts of the accessory 10. On the top of the case 12, the accessory 10 is provided with means for attaching 14 the accessory 10 to a fishing pole 11. The means for attaching 14 on the top of the accessory 10 has a slot 16 formed by two ears 18 that are located on either side of the slot 16 to allow a fishing rod to be inserted between the ears 18 and into the slot 16. A sleeve 20 then slips over the ears 18 to thereby retain the rod within the slot 16.

To remove the accessory 10 from the fishing pole 11, the sleeve 20 is first removed from around the two ears 18 and then the fishing pole 11 can be removed from the slot 16 by moving the rod between the two ears 18. Obviously, if the accessory 10 is incorporated in the fishing pole 11 when the pole 11 is manufactured, the accessory 10 may not require a separate protective case 12 or separate means for attaching 14 it to a fishing pole 11.

The case 12 has three buttons 22, 24, and 26 on its left side 28, as seen in FIG. 1. These three buttons 22, 24, and 26 are located over pressure sensitive switches 30, 32 and 34, respectively. These pressure sensitive switches are the power switch 30 and two setting switches, i.e. an alarm mode switch 32 and sensitivity switch 34 which are illustrated schematically in FIGS. 7 and 8. Pressing one of the buttons 22, 24 and 26 results in the associated pressure sensitive switch 30, 32, and 34, respectively, being pressed. The function of each of these switches 30, 32, and 34 will be more fully explained thereafter. The case 12 is preferably constructed of a transparent or translucent material such as plastic so that first and second LEDs 36 and 38 located within the case 12 and surrounding the power switch 30 can be seen when lighted, as will be more fully explained hereafter.

Figure 8:
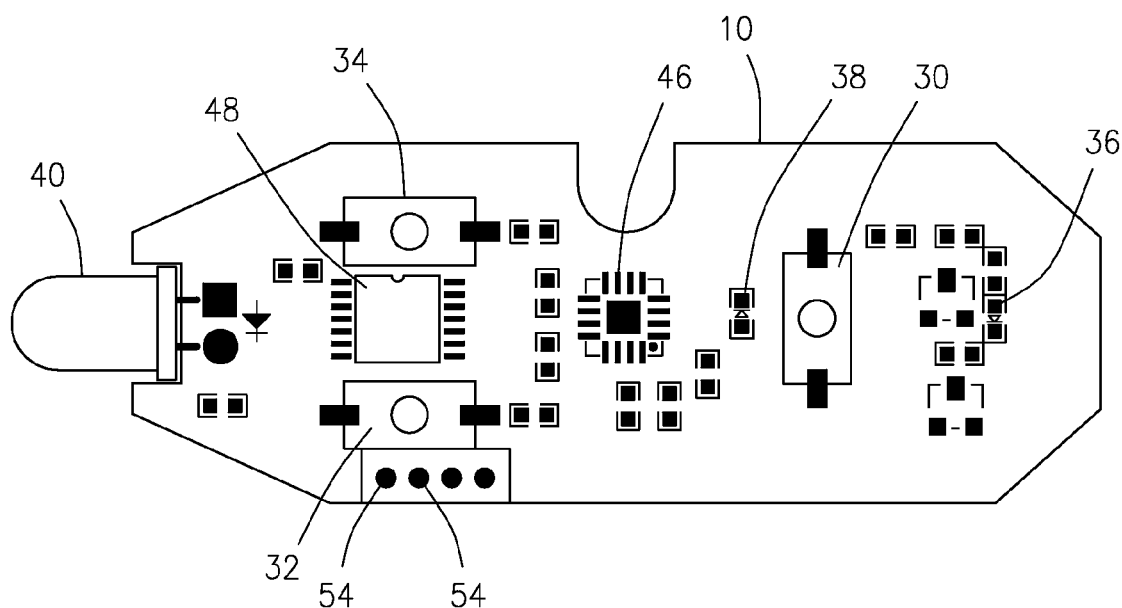
FIG. 8 is a schematic showing the internal components located on the left side of the accessory.
Figure 9:
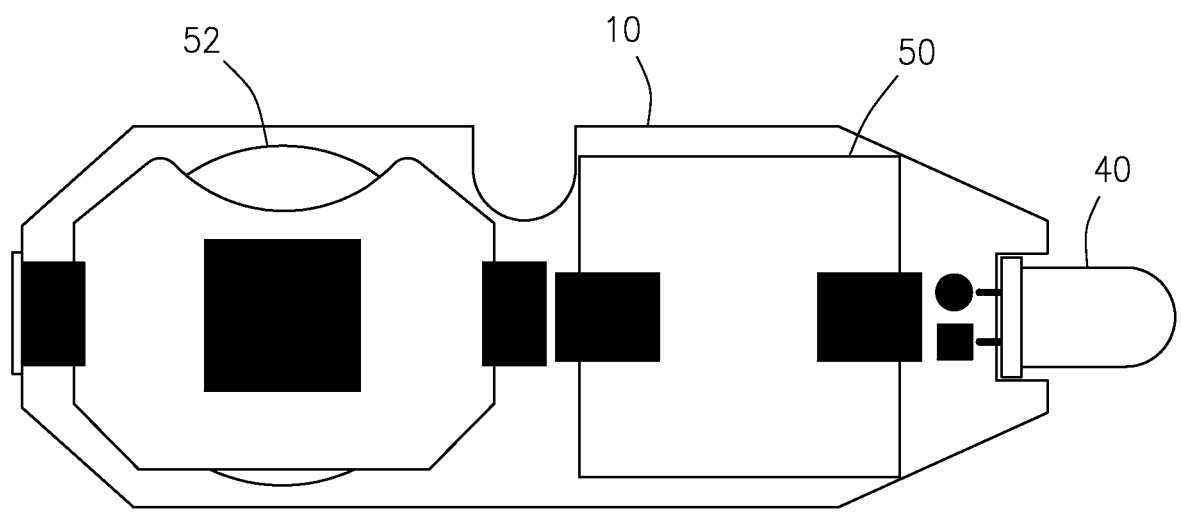
FIG. 9 is a schematic showing the internal components located on the right side of the accessory.

The case 12 is also provided with a clear or translucent lens 42 on its front end to allow light from a third LED 40 which is located internally within the case 12 at the front end 44 of the accessory 10, as shown schematically in FIGS. 7-9, to shine there through in order for the accessory 10 to serve as a miniature flashlight and as a visual alarm, as will be more fully explained hereafter.

Referring now to FIGS. 7 and 8, the heart of the accessory 10 is the relatively new technology of a miniature dual axis accelerometer integrated circuit or simply an accelerometer 46. The accelerometer 46 allows the accessory 10 to detect not only vibrations in fractions up to 1 G of force, but with the dual axis allows the accessory 10 to detect its rotational angle relative to the surface of the earth.

This rotation or force is measured and referenced using a microcontroller or microcontroller chip 48 that runs a program developed solely for this accessory 10. The microcontroller 48 monitors several operator inputs to set its operating parameters. These inputs are entered by pressing the three buttons 22, 24, and 26 to activate, respectively the power switch 30, the alarm mode switch 32 and the sensitivity or strike level switch 34.

In addition to turning power to the accessory 10 on and off, the power switch 30 that has as an additional function setting operating method to either vibration or rotation angle. The vibration method detects the rotation of the pole 11 per unit time or the speed of jerk on the pole 11 caused by a fish bite. The rotation method detects the rotation of the pole 11 independent of time or the degree of rotation regardless of the speed of the jerk on the pole 11 by the fish bite.

Another input to the microcontroller 48 is the alarm mode switch 32 which sets the alarm mode between sound (audio alarm mode) and light (visual alarm mode) or both (combined audio and visual alarm mode).

The last operator input is the sensitivity switch 34 which sets the level of sensitivity or angle needed to trigger an alarm of the accessory 10. The accessory 10 includes back lighting surrounding the power switch 30 which is created by the first and second LEDs 36 and 38. This backlighting is used to indicate a power on condition by a quick flash every 10 seconds. The microcontroller also controls two alarm outputs which are the very bright third LED 40 and a piezo speaker 50. The accessory 10 is powered by a single CR-2032 coin cell battery 52. This type of battery is readily available at most retail store or automobile parts stores since this is type of battery used in most automobile door key fobs. Both the speaker 50 and the coin cell 52 are shown in FIG. 9.

The accessory 10 is also provided with ports 54 that can be used to download programs to the microprocessor chip 48 contained within the accessory 10.

Operation

The present invention 10 is a fish detection system and accessory to be installed on the end of a fishing pole 11. It is designed to give the fisherman the maximum flexibility in detection a bite on multiple types of poles 11, in the dark, or while taking a nap. The accessory 10 has many settings for alarm method and for bite detection level and has one power switch 30 and two setting switches 32 and 34. The function of each switch 30, 32, and 34 will be described hereafter. The operation of the accessory 10 is controlled by the accessory's microprocessor 48 which serves to coordinate and control all of the accessory's functions. Programs for the microprocessor 48 can be loaded via the ports 54 provided on the accessory 10. The microprocessor 48 receives power from a coin cell battery 52 that powers the entire accessory 10. The microprocessor 48 receives input from the accelerometer 46, from the power switch 30 and from the two setting switches 32 and 34 and processes those inputs to control the operation of the speaker 50, the third alarm LED 40 and the first and second or backlight LEDs 36 and 38.

The power switch 30 serves to turn the accessory 10 on and off and serves to set the detection method for the accessory 10. When the accessory 10 is off, pressing the power switch 30 will power on the accessory 10. A sequence of tones that step up, as indicated in Chart 1 below, are produced by the speaker 50 to indicate that the accessory 10 is powering up. Each of Charts 1-4 shows a graph of the sound produced by the speaker 50, with the x-axis for each chart being the passage of time and the y-axis for each chart being the change in pitch of the tone produced. Thus, as the pitch tone increases or becomes higher over time, the line on the chart rises, and as the pitch tone decreases or becomes lower over time, the line on the chart falls. Chart 1 illustrates the step up sequence of tones made by the speaker 50 as the accessory 10 powers up.

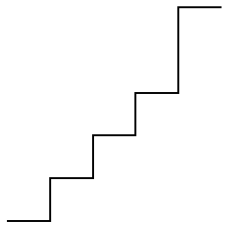

Chart 1

When the accessory 10 is on, each time the power switch 30 is pressed quickly, this toggles the accessory 10 between its two possible detection methods. The first detection method is a vibration or strike method. This method alarms when a fish strikes or jerks on the line and fishing pole 11, thereby generating a pulse or vibration that is detected by the accelerometer 46 of the invention 10. When this method is selected the speaker 50 will produce a two tone high-low-high-low signal indicating that a vibration has been detected. The sound produced by the speaker 50 in the vibration or strike method when a vibration is detected is a repeating high-low-high-low tone as illustrated in Chart 2 below.

Chart 2

The second method is a rotation or angle method. This method alarms when a fish pulls the line and starts to bend the pole 11. In this mode, the speed of the strike is not a factor. In this method, the accessory 10 first detects and records its resting position and then it awaits a preset angular change before generating an alarm. When this rotation or angle method is selected and a preset angular change in the angle of the pole 11 is detected, the speaker 50 will produce a ramping up-ramping down-ramping up-ramping down tone signal as illustrated in Chart 3 below.

Chart 3

Finally, if the power switch 30 is pressed and held down for three (3) seconds or more as indicated by the first and second LED back lighting 36 and 38 turning on solid, and then the power switch 30 is released, the accessory 10 will power down. Also, if no alarm or switch activity has been detected in 30 minutes, the microprocessor 48 will automatically power the accessory 10 off to preserve the life of the battery 52 over long periods of non-use. When the accessory 10 powers down, the speaker 50 will produce a series of tones going down in pitch similar to what you might hear on an electronic game to signify "game over". The series of tones produced by the speaker 50 when the accessory 10 powers down are illustrated in Chart 4 below.

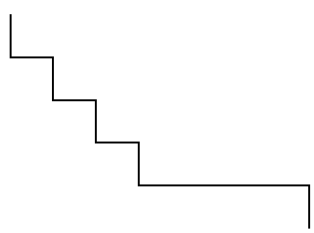

Chart 4

When the accessory 10 is powered off, the microprocessor chip 48 which is the main processor for the accessory 10 will record it settings so that the next time the accessory 10 is used, it will power up with the settings preset to those that the user likes.

The alarm mode switch 32 controls which of three modes of alarm the accessory 10 will employ when it detects a fish bite. Each time this alarm mode switch 32 is pressed, the accessory 10 will toggle between the three modes of alarm which are visual (flashing of the third LED 40), auditory (beeping tone produced by the speaker 50) or both visual and auditory (flashing of the third LED 40 and beeping tone produced by the speaker 50).

The sensitivity or strike level switch 34 controls the sensitivity of the accessory's detection of a fish. The strike level switch 34 must be pressed and held to operate it. The first time the strike level switch 34 is pressed and held, the sensitivity level will decrease incrementally until the lowest sensitivity level is reached. This means that the accessory 10 will detect only very violent strikes or an angular movement or displacement that is greater than 90 degrees, respectively, depending on whether the accessory 10 is operating in the first method, i.e. the vibration or strike method, or is operating in the second method, i.e. the rotation or angle method. Only large movements will set off the alarm, i.e. either visual alarm, auditory alarm or both visual and auditory alarms, when the strike level is at its lowest sensitivity level.

Pressing and holding the strike level switch 34 a second time increases the sensitivity level incrementally until the highest level of sensitivity is reached. This means that the accessory 10 will detect very small vibrations or angular changes of less than 1 degree. The accessory 10 is provided with fifty (50) discrete sensitivity levels ranging from the lowest sensitivity level to the highest sensitivity level.

When the alarm mode is set for visual alarm or is set for both auditory and visual alarm, then the third LED 40 will get dimmer or brighter to indicate the sensitivity level as the sensitivity level is changed. The dimmest setting of the third LED 40 indicates that the most sensitive level for the accessory 10 is reached and the brightest setting of the third LED 40 indicates that the least sensitive level for the accessory 10 is reached.

If the alarm mode is set for auditory mode or for both auditory and visual mode, then the speaker 50 will produce a tone that indicates the sensitivity level. The lowest tone indicates the lowest sensitivity level for the accessory 10 and the highest tone indicates the highest sensitivity level for the accessory 10.

The strike level switch 34 is held down until the desired strike level sensitivity is reached and is then released to set the sensitivity level. Using the strike level switch 34, sensitivity of the accessory 10 can be set to detect a small nibble on a calm day on the bank, a strike while on a mildly rocking boat, or a strike while in deep sea waves.

Pressing both the alarm mode and strike level switches 32 and 34 simultaneously will turn on the third LED light 40 for fifteen (15) seconds so that the third LED 40 can be used as a mini flashlight. This function might be helpful in tying a hook to a fishing line, light activating bait such as maggots, or finding car keys. Pressing the alarm switch 32 again will turn off the third LED light 40 or, alternately, the third LED light 40 will automatically turn off by itself at the end of the fifteen (15) seconds and the accessory 10 will return to its detection mode.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A fishing pole accessory for use with a fishing pole, the accessory comprising:
   a dual axis accelerometer integrated circuit detecting vibrations of the accessory and rotational angle of the accessory relative to a surface of the earth;
   a user input device;
   an alarm device; and
   a microcontroller in data communication with the accelerometer, the user input device, and the alarm device; the microcontroller having programming that:
   (a) computes tilt of the accessory independent of time using data from the accelerometer;
   (b) computes tilt of the accessory per unit time using data from the accelerometer;
   (c) activates the alarm device when a computed time-independent tilt value determined by the micrcontroller exceeds a selected time-independent tilt value input through the user input device; and
   (d) activates the alarm device when a computed time-dependent tilt value determined by the microcontroller exceeds a selected time-dependent tilt value input through the user input device.

2. The fishing pole accessory of claim 1, wherein:
   the alarm device comprises an audible alarm and a visual alarm; and
   the microcontroller programming uses data input through the user input device to select between:
   (a) activating the audible alarm and not activating the visual alarm;
   (b) activating the visual alarm and not activating the audible alarm; and
   (c) activating both the audible alarm and the visual alarm.

3. The fishing pole accessory of claim 1, further comprising a port in data communication with the microcontroller to allow the microcontroller to communicate with an external device.

* * * * *